United States Patent [19]

Simmons

[11] Patent Number: 4,694,534
[45] Date of Patent: Sep. 22, 1987

[54] APPARATUS FOR ELECTRICALLY STUNNING POULTRY

[76] Inventor: Lacy Simmons, P.O. Box 546, Dallas, Ga. 30132

[21] Appl. No.: 821,912

[22] Filed: Jan. 23, 1986

[51] Int. Cl.$^4$ .......................... A22B 3/06; A22C 21/00
[52] U.S. Cl. .......................................... 17/1 E; 17/11
[58] Field of Search ............... 17/1 E, 11, 12; 269/60, 269/61, 289 R, 320

[56] References Cited

U.S. PATENT DOCUMENTS

| | | | |
|---|---|---|---|
| 2,323,141 | 6/1943 | Lancaster | 269/61 X |
| 2,990,171 | 6/1961 | Grove et al. | 269/61 X |
| 3,564,645 | 2/1971 | Brugman | 17/1 E X |
| 3,828,397 | 8/1974 | Harben, Jr. | 17/1 E X |
| 4,092,761 | 6/1978 | McWhirter | 17/1 E |
| 4,153,971 | 5/1979 | Simonds | 17/1 E X |

*Primary Examiner*—Willie G. Abercrombie
*Attorney, Agent, or Firm*—Eric P. Schellin

[57] ABSTRACT

The present invention provides a saline solution containing elongated trough which is mounted at the end portions of four non-electronically conducting ports. The trough has an ingress funnel arrangement designed to control the thrashing of to-be-electrically-stunned birds and an elongated grid having a portion immersed in the solution and a downstream portion out of the solution. The four posts extend upwardly and terminate in threaded portions. A frame carriage is provided which has four corners and at the four corners are suitable mounted driven gears with internal bores and threads adapted to enjoyingly rotate about the threaded portions of the ports. The carriage is suitable affixed to a conventional I-beam to which is movingly mounted a conventional endless cable and space shackle system for conveying birds in an upside down manner. The four mounted gears are rotatable in unison by a chain drive whereby the trough may be selectively moved upwardly or downwardly as found necessary to vary the distance between the said I-beam and said trough to accommodate different sized shackles and/or birds.

8 Claims, 9 Drawing Figures

APPARATUS FOR ELECTRICALLY STUNNING POULTRY

BACKGROUND OF THE INVENTION

It is well known in the art to kill poultry by cutting off the head of poultry completely or to at least cut the neck of the poultry in a manner to cut the jugular veins one or both of the two carotid arteries and to sever the vagus nerves. The latter operation is usually carried out while the bird is in a hanging upside down position being supported by its legs on shackles. The shackles are conventionally pivotally mounted by a yoke to a fitting having bifurcated means and rollers thereon, the rollers are mounted whereby they roll on the horizontal surface of an I-beam at either side of the vertical connecting web portion of the I-beam. A plurality of the fittings are equidistantly spaced and secured to an endless cable by suitable clamping means.

Stunners are known whereby a bird which is fitted alive and upside down to a conventional shackle is then passed on an endless conveyer means into contact with saline solution which has one side of an electric current. The other side of the electric current is applied to the birds through the metal shackles. When the so grounded bird touches the electrically charged saline solution the bird is stunned whereby it is lulled into essentially a quiesient mode necessary to avoid frantic efforts on the part of the bird as it approaches the downstream stations such as the killing and neck breaking stations. Frantic activity can cause dislocation of joints leading to the rejection of birds.

The prior art devices are constructed to deal with a single size of shackle and a narrow range of sizes of birds. In other words the relationship of dimensions between the distance of the said I-beam and the saline solution is not variable. At the same time the egress into the bath is not constructed to adequately control the bird as it thrashes about as it is conveyed as heretofore mentioned.

BRIEF DESCRIPTION OF THE INVENTION

The present invention provides a saline solution containing an elongated trough which is mounted at the end portions of four non-electronically conducting posts. The trough has an ingress funnel arrangement designed to control the thrashing of to-be-electrically-stunned birds and an elongated grid having a portion immersed in the solution and a downstream portion out of the solution. The four posts extend upwardly and terminate in threaded portions. A frame carriage is provided which has four corners and at the four corners are suitably mounted driven gears with internal bores and threads adapted to engagingly rotate about the threaded portions of the ports. The carriage is suitably affixed to a conventional I-beam to which is movingly mounted a conventional endless cable and space shackle system for conveying birds in an upside down manner. The four mounted gears are rotatable in unison by a chain drive whereby the trough may be selectively moved upwardly or downwardly as found necessary to vary the distance between the said I-beam and said trough to accommodate different sized shackles and/or birds.

DETAILED DESCRIPTION OF THE INVENTION

Figure 1:
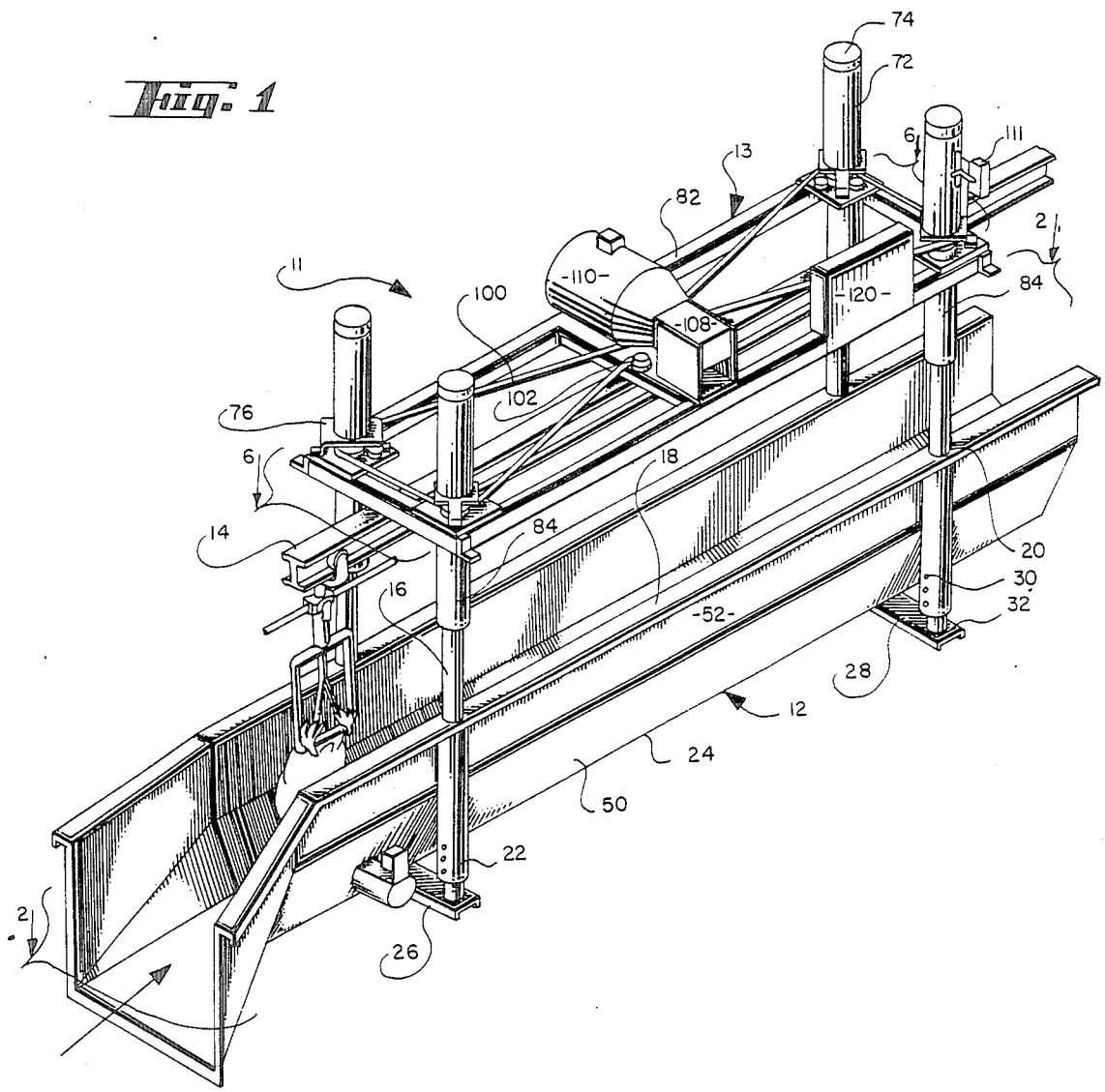
FIG. 1 is a perspective view of the stunner of the present invention.

Turning to the drawing FIG. 1 depicts the present invention stunner for poultry. Reference numberal 11 refers to the elongated trough 12 in which is supplied a quantity of a saline solution which is the electrolyte. Above the trough 12 is a carriage 13. It will be seen that the carriage is secured to in centered straddle fashion a conventional I-beam 14, not a part of the invention. Under normal operating circumstances the lower member of the I-beam carries equi-spaced rollers from which depend shackles connected by an endless driven cable, shown diagrammatically. The shackles are conventional and well known in the art and are detailed to hold the feet of a to be butchered poultry such as a chicken, turkey and the like. In other words the bird proceeds through the stunner in a vertical upside down position in a direction as depicted by the arrow.

The carriage 13 is mounted on four non-electrically conducting tubes 16. The trough 12 has a horizontally outwardly extending flange 18 at either side thereof.

The said flanges 18 has four openings 20 through which said tubes 16 extend thereinto. Depending integral from each of the openings 20 at the underside of the flanges 18 are co-equal in length in each case a tube 22. The said non-electrically conducting tubes 16 extend to a plane essentially even with the bottom 24 of the trough and a pair of a forward set of tubes 16 terminate with connecting cross-piece 26 and the rearward set of tubes 16 terminate with a like constructed cross-piece 28. The said trough rests on said cross-pieces 26, 28 either directly or through gross location means.

The gross location means is achieved by matching the appropriate location holes 30 in tube 22 with location holes 32 in non-electrically conducting tubes 16. In this manner with distance between the I-beam 14 and the trough may be grossly located to accommodate the operation such as turkeys or smaller birds such as chickens or a change in the gross distance may be necessary with the use of different length shackles. Of course, as was stated heretofore a further control distance between the I-beam and the trough will be achieved by moving the trough 12 up or down by the operation of the carriage 13.

Before discussing the component details with regard to the carriage 13 and the operation thereof, it is propitious to discuss in further detail the nature of the trough.

Figure 2:
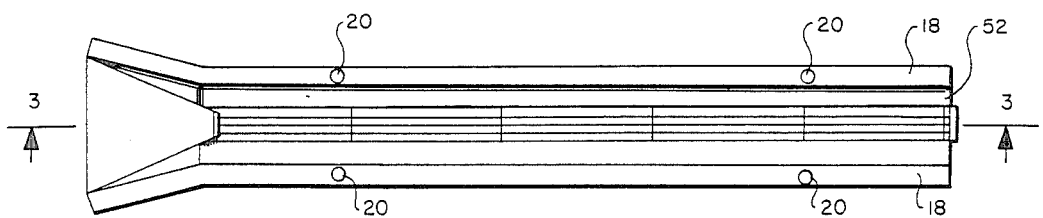
FIG. 2 is a top plane view of the trough as seen from a plane 2—2 of FIG. 1.
Figure 3:
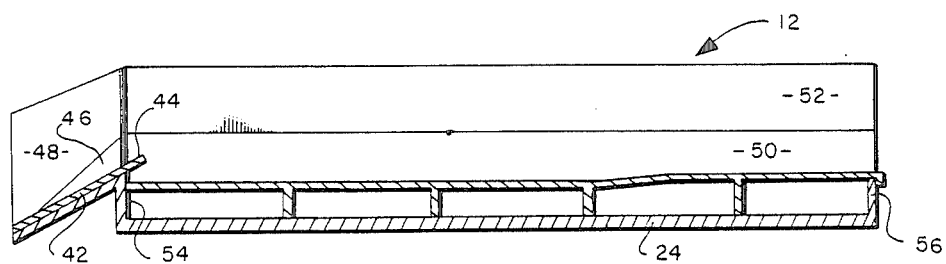
FIG. 3 is a cross-sectional view of the trough taken along lines 3—3 thereof, of FIG. 2.
Figure 4:
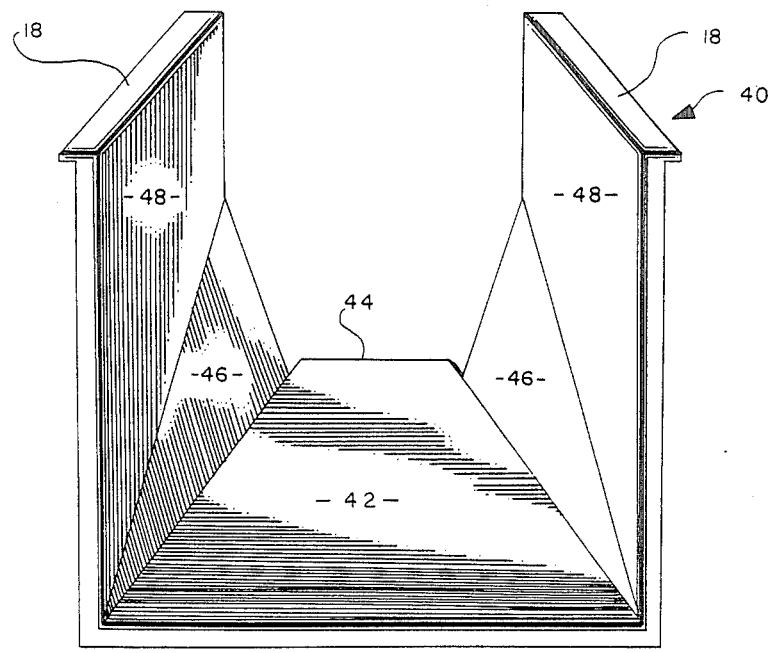
FIG. 4 is a close-up of the entrance portion of the trough.
Figure 5:
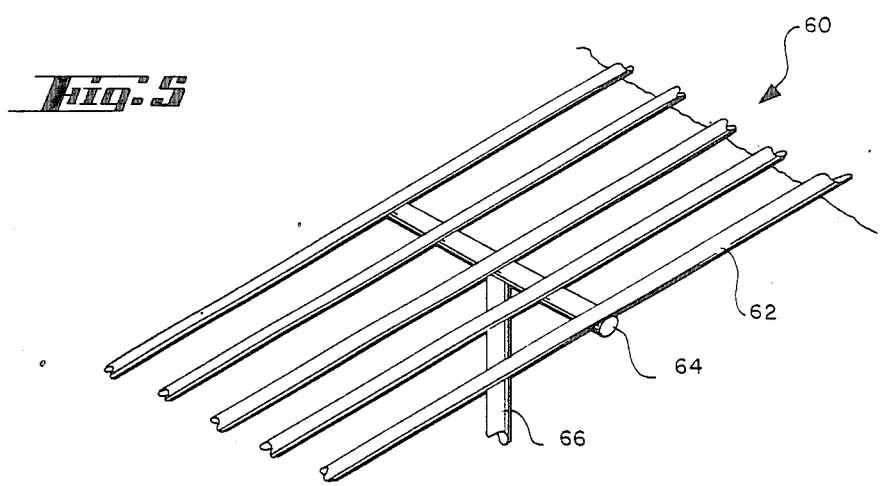
FIG. 5 is an enlarged perspective of a portion of the grid.
Figure 6:
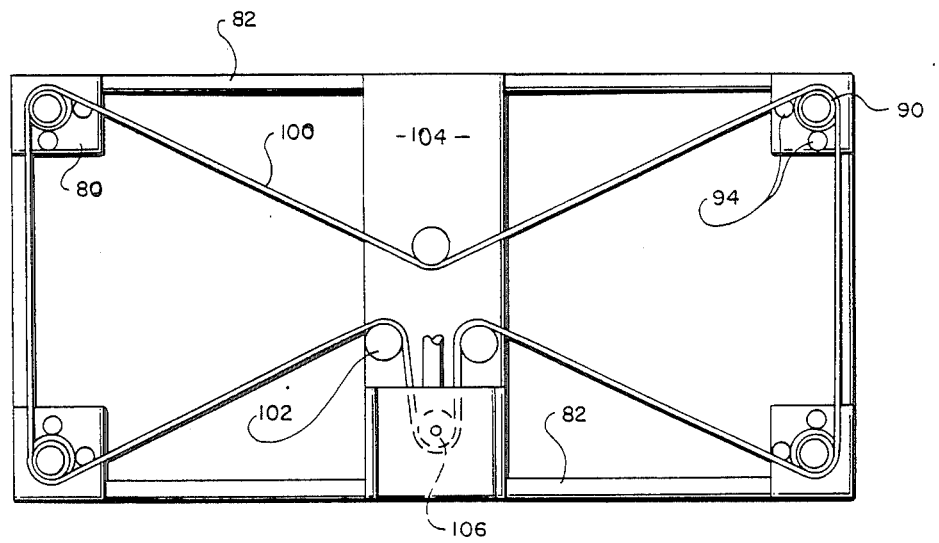
FIG. 6 is a top plan view of a plane 6—6 of FIG. 1, showing the carriage.
Figure 7:
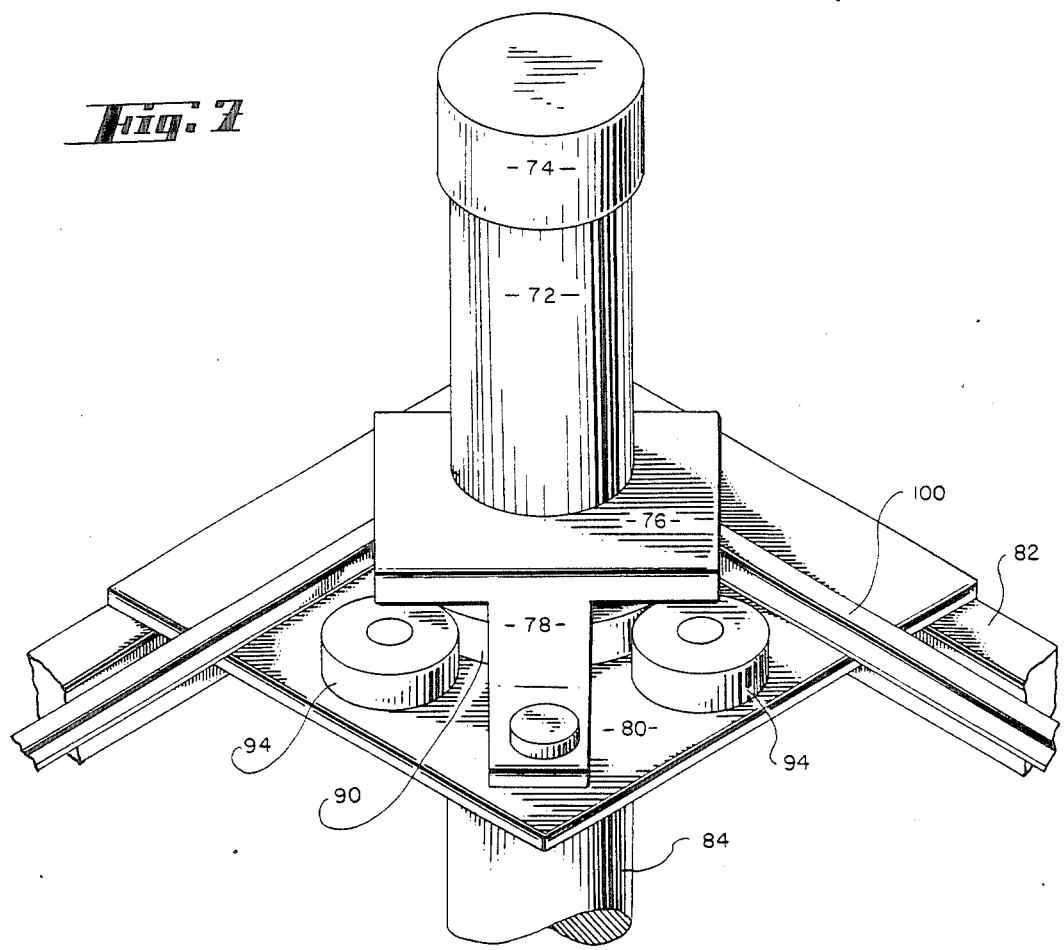
FIG. 7 is a perspective of one corner portion of the carriage.
Figure 8:
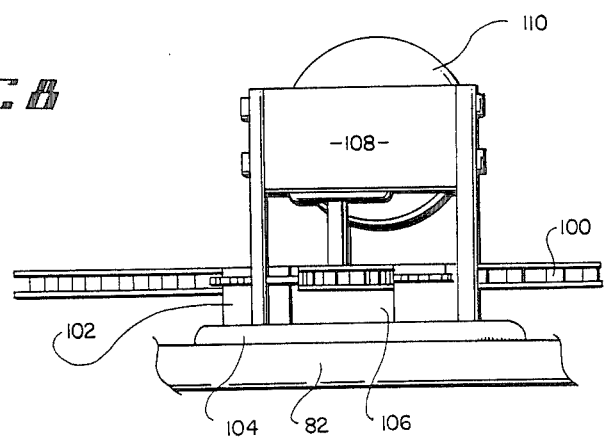
FIG. 8 is a side view of a central portion of the carriage.

In respect thereto, attention is now directed to not only FIG. 1 but this figure should also be considered with FIGS. 2, 3 and 4.

The trough 12 has at its ingress portion a funnel arrangement 40, which can be seen in a greater degree of particularity in FIG. 4. The funnel narrows in the direction of the remainder of the trough 12. The funnel arrangement is covered with a polymeric elastomer of a non-electrically conducting material such as polypropylene whereby no electrically conducting pathway to the bird can be achieved.

The funnel arrangement 40 has an upwardly inclined floor 42 having a trapezoidal configuration extending to produce a lip portion 44 extending over a portion of the saline containing portion of the trough (see FIG. 3). The side walls of the funnel arrangement 40 has side walls consisting of lower triangular portions 46 and upper trapezium portion 48. It has been discussed that dimensional ratios are useful in carrying out the precepts of the invention. The leading edge for the bottom 42 of the funnel arrangement may be about 18 inches; the axial length of about 18 inches is appropriate. The floor 42 should have a diminished width of only 5 inches and the lip 44 should extend axially about three inches.

The main body of the trough has a bottom 24 somewhat constricted with regard to the more spaced side walls made up of elongated horizontal portions 50 and 52, the latter the uppermost portion. The distance of the walls 50 from each other where the lip 44 enters the saline solution area is about 5 inches and the lip has an over lay thereinto of about three inches. The distance between both of walls 50 where they join with horizontal walls 52 may be about 10 inches. Wall 52 slants whereby at its upper terminus it is about 11 inches. The saline electrolyte containing portion of the trough is defined by upstanding front wall 54, end wall 56, the lower portion of side walls 50 and the bottom 24. The upper portion of egress end of the trough 12 does not possess a wall as the birds after being stunned pass out of the trough between the upper portion of side walls 50 and side walls 52.

Note from FIG. 1 that a port is provided through the forward end of said wall 50 through which a combination liquid level sensor and saline make-up fluid connector 58 is positioned. One side of the line electrical connection may be made therethrough.

It will be noted from FIG. 2 that the saline containing portion of the trough is supplied with a grid 60 which is wetted with saline for most of its length. It consists of five elongated metal rods 62 held together by approximately equi-distantly disposed cross rods 64. Centrally located of each cross rod is a downwardly disposed rod 66 which acts as a leg to partially support the grid which is also supported by sloping sidewalls 50. The front end of the grid extends below the lip 44 and extends to an end consisting of a depending flange 68 suitably welded to connect the elongated rods 62. The flange has holes therethrough (not shown) which are adapted and constructed to be in alignment with holes in end wall 56 whereby the grid 60 may be bolted to the end wall 56.

From FIG. 3 it will be noted that the grid 60 slopes upwardly for about the last fifth of the trough. The slope is sufficient to be of a height taking it out of immersion in the saline solution.

Having described the trough 12 it is pointed out that stunning of the bird occurs only in that portion of the trough having the saline solution. The dimensions of the elongated portion of the trough are such that the bird may get successive stunning shocks during its course through the trough 12 i.e. of about 7 seconds duration. Furthermore by having a sloping out of the saline solution portion of grid 60, as depicted in the above, the bird's head is prevented from touching the saline solution thereby permitting and achieving some draining of the excess saline solution from the bird. By this arrangement the need for make-up saline solution is somewhat diminished.

Having discussed the configuration of the trough in sufficient detail to provide good elucidation, attention is now directed to FIGS. 6, 7, 8 and 9 which should also be taken in conjunction with FIG. 1.

The carriage 13 is adapted and constructed to provide the equivalent of fine tuning, i.e. to achieve approximately a seven and one half inch movement in any direction so that the trough is moved closer or further away by said dimensional amount.

As was stated in the above, the carriage is mounted on four non-electrically conducting tubes 16. Each of the tubes terminate at the top with an elongated threaded portion 70 as can best be seen from FIG. 9. Each of the threaded portion 70 is surrounded by a metal tube 72 which has a plastic cap 74 having a cup configuration. The tube is mounted on a plate 76 which has an opening therethrough through which the treaded portion extends. The plate 76 has two flanged legs and feet 78 and is mounted in spaced relationship between a plate 80 mounted at each corner of a rectangularly disposed frame 82. The plate 80 has depending therefrom a tube 84 as can be seen from FIGS. 1, 7 and 9. The plate 80 has an appropriate opening whereby the treaded portion 70 aforementioned may pass therethrough. Sandwiched between plate 76 and plate 80 is a gear 90 having a threaded bore therethrough adapted and constructed to be in threaded engagement with the threaded portion 70. The gear 90 has a lower enlarged annular portion 92 adapted to be thrust against spaced journalled rollers 94. The central portion of the gear is gear teeth 96 and the upper portion of the gear 90 has another annular portion 98 of smaller diameter than portion 92.

An endless gear tooth accepting chain 100 passes around and meshes with the teeth portion 96. As similar elements are located in each corner as can be seen from FIG. 6, especially, the endless chain is clearly seen passing around each of the gears 90 and around idler toothed gears 102 which are mounted on cross piece 104 which in turn is mounted on the frame 82 as noted in FIG. 6. The chain 102 is driven by toothed gears 106 which is driven from a conventional gear and speed reduction box 108 of conventional construction. The gear box is in turn is operatively connected to an electric reversible motor 110. When the motor operates the chain is driven in one selected direction. As the chain moves each of gears 90 is rotated and as a result of being in threaded engagement with the threaded portions 70 at each of the corners of the carriage 13 the entire carriage 13 moves uniformly upwardly or downwardly on said threaded portions 70. As the tubes 16 has affixed thereto the said trough 12 the trough is moved up or down in response to the positioning of gear 90 on the threaded portion 70 of the tubes 16 and therewith the distance between the trough and the I-beam may be varied a selected distance in the manner and for the reason aforementioned.

Figure 9:
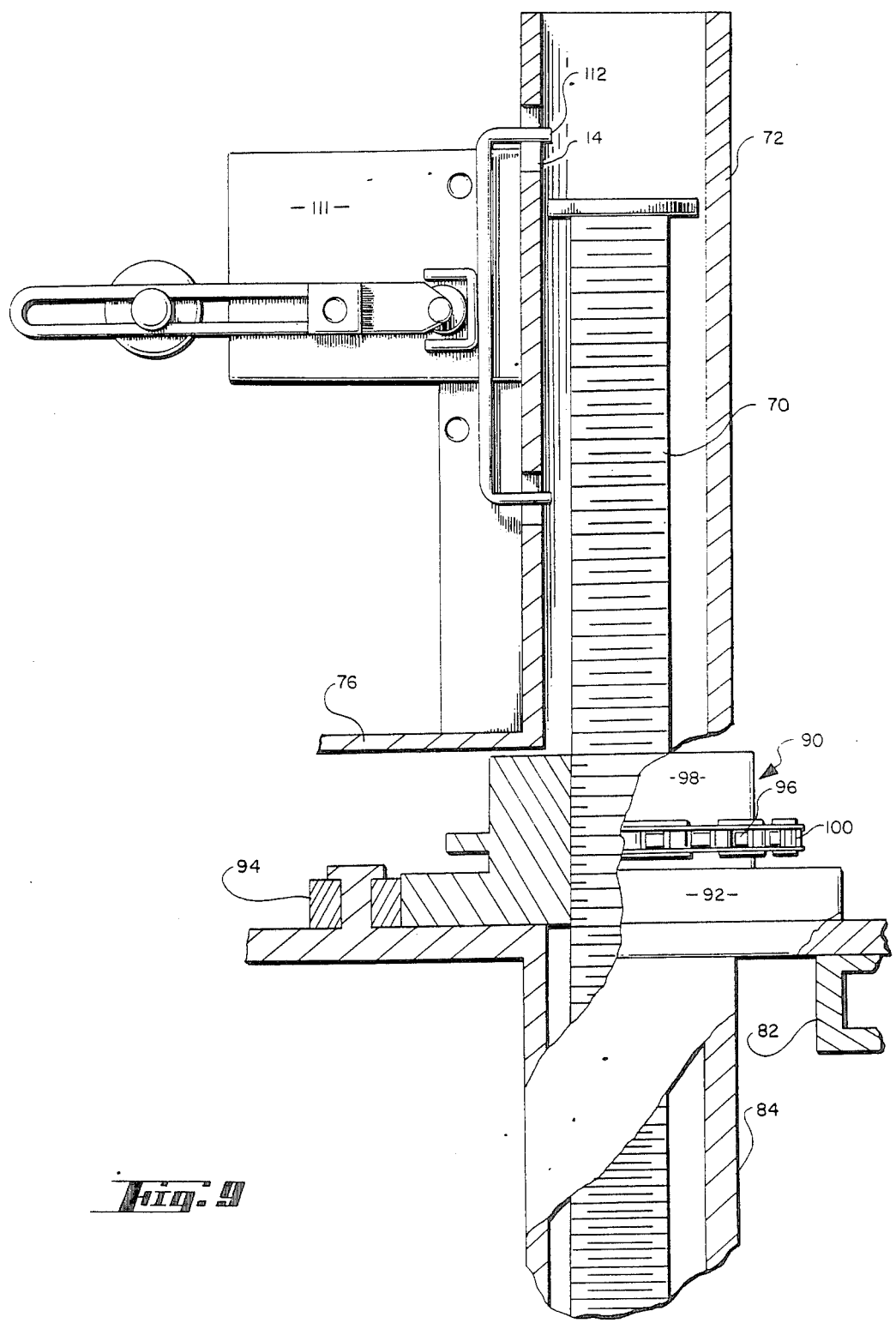
FIG. 9 is a cross-sectional view of one of the corners of said carriage.

In order to prevent an undesirable parameter of movement, a limit switch 111 is employed as seen in FIG. 1 with a more detailed depiction by FIG. 9. The limit switch is of a conventional type. It is suitably mounted to one of the tubes 72 and is depicted in somewhat diagrammatic form in FIG. 9. Suffice to say that the upper and lower levers 112 of the actuating means protrude in appropriately located upper and lower opening 114. The tripping means is in the form of a disc 116 mounted at the end of a single threaded portion 70 and has a diameter somewhat more than threaded portion 70 whereby it extends radially therefrom and comes into either of the upper or lower levers 112 depending upon the direction of movement whereby the limit switch 111 interrupts the electricity supplied to the motor 110.

The limit switch is supplied with conventional adjustable weight balanced means to adjust the degree of upset needed to operate the switch. An electric switch housing 120 is mounted in the frame 82. An electric connection is also supplied to a suitable electric conducting pathway whereby electricity is supplied to the shackles carrying the birds of a polarity opposite to the polarity of the electricity being supplied to the saline solution and the trough 12. The voltage need not be greater than 50, as a matter of fact it works quite well at considerable lower voltages. The electricity is D.C. oriented but is pulsating having a square ware form. The lower voltages are desirable in order to avoid work place injuries.

What is claimed is:

1. A stunner for poultry and the like comprising an elongate trough; the trough having a bottom, outwardly and upwardly flaring side walls and an end wall and an entrance, all defined to contain a relatively small quantity of an electrolytic solution, said wall terminating with a lip means adapted to overlie said electrolytic solution, said entrance including an upwardly and inwardly sloping floor, said entrance also including inwardly and outwardly flared side walls, said end wall defining a small height thereby permitting egress from said trough between said side outwardly and upwardly flaring walls, said trough having an elongated horizontal grid spaced from the bottom thereof and sloping upwardly in the direction of said end wall whereby in use the portion of said grid which slopes upwardly is not immersed in said electrolytic solution, said trough mounted to a plurality of upwardly extending means, said means terminating in upwardly extending threaded means, a carriage means displaced vertically over said trough, means mounted on said carriage means adapted and constructed to operatively act on said threaded means, said means mounted on said carriage means adapted and constructed to selectively rotate on said upwardly extending threaded means whereby said carriage means when said carriage means operates to increase or decrease the distance between said trough and said carriage means.

2. The stunner of claim 1 wherein the means mounted on said carriage means adapted and constructed to selectively rotate on said upwardly extending threaded means is a gear means having a threaded bore therethrough adapted and constructed to be in threaded engagement with said upwardly extending threaded means and said gear means is driven by means.

3. The stunner of claim 2 wherein the said gear means has a toothed gear portion and driven endless chain means driven said gear portion thereby said gear means is selectively rotatable.

4. The stunner of claim 3 wherein the plurality of upwardly extending means is four in a number and said carriage means is mounted thereon through said gear means on each of said threaded means of said upwardly extending means.

5. The stunner of claim 4 wherein the endless chain means drives each of said gear means in unison.

6. The stunner of claim 1 wherein the upwardly and inwardly sloping floor of the entrance is faced with a non-electrically conducting material and said inwardly and outwardly flared side walls of said entrance is faced with a non-electrically conducting material.

7. The stunner of claim 6 wherein the the carriage means and said trough are electrically isolated.

8. The stunner of claim 7 wherein the carriage means possesses a rectangular configuration and said gear means is mounted at substantially each of the corners thereof.

* * * * *